(12) United States Patent
Popielas

(10) Patent No.: US 7,727,341 B2
(45) Date of Patent: Jun. 1, 2010

(54) CYLINDER HEAD GASKET

(75) Inventor: Frank W. Popielas, Plainfield, IL (US)

(73) Assignee: Dana Automotive Systems Group, LLC, Toledo, OH (US)

( * ) Notice: Subject to any disclaimer, the term of this patent is extended or adjusted under 35 U.S.C. 154(b) by 0 days.

(21) Appl. No.: 12/384,494

(22) Filed: Apr. 6, 2009

(65) Prior Publication Data
US 2009/0200753 A1 Aug. 13, 2009

Related U.S. Application Data

(62) Division of application No. 11/066,084, filed on Feb. 25, 2005, now abandoned.

(51) Int. Cl.
C22C 38/00 (2006.01)
C22C 19/03 (2006.01)

(52) U.S. Cl. .................... 148/320; 148/33; 277/595

(58) Field of Classification Search .............. 277/595; 148/33, 320
See application file for complete search history.

(56) References Cited

U.S. PATENT DOCUMENTS 6,357,758 B1 * 3/2002 Zurfluh ................. 277/595

FOREIGN PATENT DOCUMENTS

AU 709908 2/1998

CN 1066491 C 5/2001

OTHER PUBLICATIONS

ASM Alloy Center, Materials Property Data from http://products.asminternational.org/matdb/index.jsp "Chromium-molybdenum alloy steel, 4140 Q/T, 2 mm round" copyright 2003. downloaded Sep. 10, 2009.*

ASM Alloy Center, Materials Property Data from http://products.asminternational.org/matdb/index.jsp "Nickel-chromium-molybdenum alloy steel, 4340, Q/T, 25 diam round" copyright 2003. downloaded Sep. 10, 2009.*

ASM Alloy Center, Materials Property Data from http://products.asminternational.org/matdb/index.jsp "Advanced Search Results" copyright 2003. downloaded Sep. 10, 2009.*

* cited by examiner

Primary Examiner—George Wyszomierski
Assistant Examiner—Tima M McGuthry-Banks
(74) Attorney, Agent, or Firm—Marshall & Melhorn LLC

(57) ABSTRACT

A gasket system is described and depicting having a gasket located between and sealing a cylinder head and a cylinder block. The gasket has a first metal layer and a second metal layer adjacent said first metal layer. The second metal layer has a bead region and a stopper region. At least a portion of the bead region has a predetermined tensile strength and a predetermined range of yield strength.

11 Claims, 2 Drawing Sheets

CYLINDER HEAD GASKET

RELATED APPLICATIONS

This application is a divisional application filed off of U.S. patent application Ser. No. 11/066,084 now abandoned filed on Feb. 25, 2005, which is incorporated by reference in its entirety herein. This divisional application is being filed during the pendency of U.S. patent application Ser. No. 11/066,084.

TECHNICAL FIELD

The present invention relates to multi-layer steel (MLS) gaskets for cylinder head gaskets and in particular to MLS gasket materials that exhibit improved sealing characteristics.

BACKGROUND OF THE INVENTION

The trends to reduce fuel consumption and emissions in internal combustion engine powered vehicles have placed increased demands on the performance of many components. Reducing fuel consumption by using lighter materials in engine cylinder blocks and head assemblies has proven successful, although the lighter alloys used typically experience greater deflection with equivalent cylinder compression ratios. This reduced stiffness may result in additional deflection within the head assembly and cylinder block, resulting in greater deflection between the head assembly and cylinder block, and thus, increased demand on a cylinder head gasket to accommodate relative deflection.

Reducing emissions by increasing the engine compression ratio has also proven successful. However, this increase in cylinder pressure typically results in increased motion between the mating surfaces of the head assembly and cylinder block. These factors, and others, have resulted in the technology of MLS cylinder head gaskets becoming an area of constant innovation.

The gasket areas immediately adjacent the circumference of engine cylinder bore apertures are subject to considerably greater stresses for assuring proper sealing than areas of the gasket radially remote from the apertures. These gasket areas immediately adjacent the circumference of engine cylinder bore apertures also experience greater displacement between the mating surfaces than areas of the gasket radially remote from the apertures. Typically, MLS gaskets incorporate at least one beaded region to ensure an adequate seal.

This displacement between the mating surfaces results in axial motion within the active layers and creates a micromotion between the active layer and any adjoining surface. This motion requires a minimum durability in the beaded region to ensure that the gasket repeatably seals between the mating surfaces.

Layers with beaded regions, also called "active" layers, exert pressure on the sealing surfaces to ensure an adequate seal. Generally, the higher the surface pressures, the better the sealing function, or sealing capability. MLS gaskets sealing between a cylinder head assembly and a cylinder block are typically exposed to temperatures that often exceed 1600 degrees F.

Selection of materials for the active layers is typically limited due to the desired hardness, durability, spring rate, ductility, softening point, and other characteristics. Conventionally, materials have been selected by considering the available desirable properties of materials that have evolved into use.

A typical material for active layers of MLS gaskets is 301 stainless steel (301 SS). Tensile strength for 301 SS is in a range of about 1350 to 1600 MPA, and yield strength is in a range of about 1050 to 1250 MPA. While 301 SS has the capacity to retain adequate properties during engine operation, improved materials are sought to increase gasket sealability, reliability, and/or capacity to withstand increased displacement between the mating surfaces.

SUMMARY OF THE INVENTION

The present invention relates to a gasket system that includes in pertinent part a gasket located between and sealing a cylinder head and a cylinder block. The gasket has a plurality of cylinder apertures, bolt apertures and jacket apertures. The gasket has a first metal layer and a second metal layer adjacent the first metal layer. The second metal layer has a bead region and a stopper region. At least a portion of the bead region has a predetermined tensile strength in a range of about 1000 MPA to about 1150 MPA, and a predetermined range of yield strength. The yield strength is greater than about 90% of the tensile strength, wherein approximately 70% of the tensile strength of about 1000 MPA to about 1150 MPA and approximately 70% of the yield strength is throughout the operating conditions of an internal combustion engine for a vehicle.

BRIEF DESCRIPTION OF THE DRAWINGS

The present invention will now be described, by way of example, with reference to the accompanying drawings, in which.

DESCRIPTION OF THE PREFERRED EMBODIMENT

Figure 1:
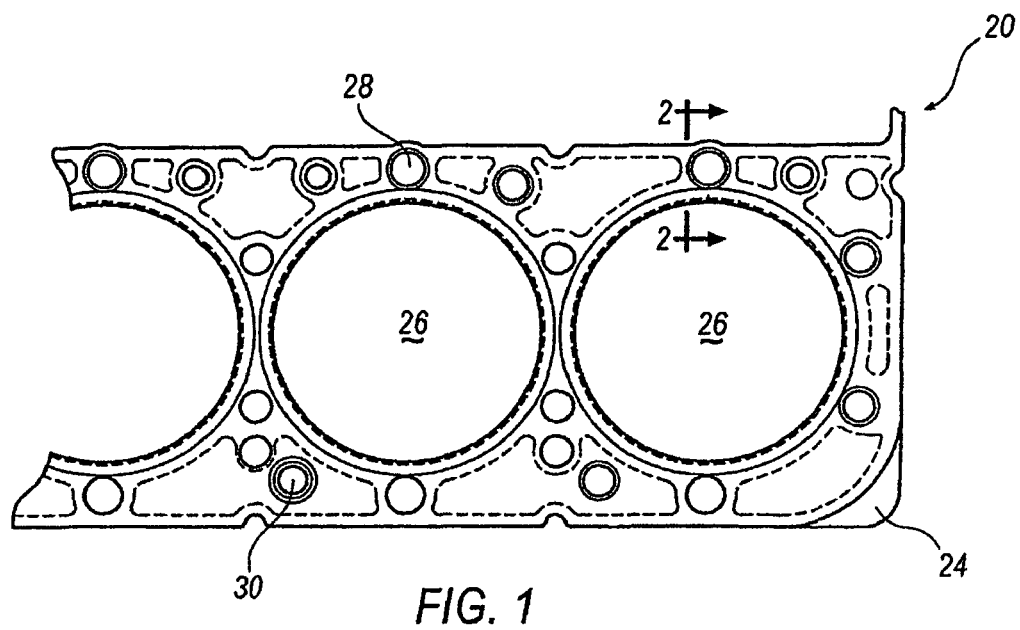
FIG. 1 is a partial view of a multi-layer steel cylinder head gasket in accordance with an embodiment of the present invention.

FIG. 1 shows an embodiment of a metal gasket 20 which is a cylinder head gasket. The gasket 20 is positioned between mating surfaces of a cylinder head assembly (not shown) and a cylinder block (not shown) of an internal combustion engine. The gasket 20 includes at least one metal layer 24. As depicted, only the uppermost metal layer 24 is shown. Each metal layer 24 is defined by a plurality of cylinder apertures 26, bolt apertures 28, and jacket apertures 30. Each jacket aperture 30 may transport a cooling fluid, or a lubricating fluid. The metal layers 24 are arranged such that the apertures 26, 28, 30 are generally aligned.

Figure 2:
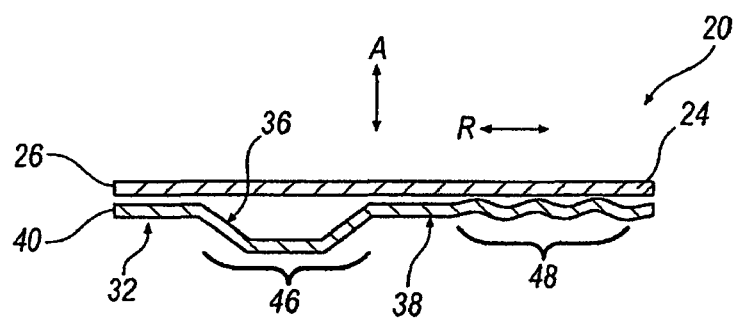
FIG. 2 is a sectional view of the gasket of FIG. 1, taken along line 2-2, with the layers separated for clarity.

FIG. 2 illustrates gasket 20 to further include a second metal layer 32. Second metal layer 32 includes a first surface 36, a second surface 38, and a cylinder region surface 40. Second metal layer 32 is also illustrated to include a bead region 46 and a stopper region 48. As illustrated, second metal layer 32 extends in a radial direction R with bead region 46 and stopper region 48 having portions that extend in an axial direction A. Second metal layer 32 acts as an active layer, as described in greater detail below.

During installation of the gasket of FIGS. 1 and 2, bead region 46 is partially compressed in the axial direction A, thereby causing bead region 46 to foreshorten in the axial direction A and portions of bead region 46 to experience some movement in the radial direction R. During engine operation, relative movement between the mating surfaces in the axial direction A requires portions of bead region 46 to elastically move in the axial direction A in order to properly seal the mating surfaces. This elastic movement in the axial direction A of bead region 46 causes micro-motion of portions of bead region 46 in the radial direction R relative to surfaces in contact with first surface 36 and second surface 38. When bead region 46 does not have sufficient strength throughout bead region 46, cracking and fretting may occur.

In order to improve the desired physical properties of materials used in active layers, such as second metal layer 32, a theoretical simulation has been performed to identify desirable properties for bead region 46. Since many physical properties of metals vary as temperatures exceed several hundred degrees F., and some physical properties vary in relation to others, material selection is complicated by a variety of competing factors.

One of these competing factors is internal stress. In order to improve durability, internal stress should be reduced. However, in order to improve sealing function, internal stress should be increased to correspondingly increase the surface pressure that bead region 46 applies in axial direction A.

Computer simulations performed by the inventor for optimizing the physical properties of bead region 46 have indicated that a tensile strength (at about 70 degrees F.) in a range of about 1000 MPA (145 ksi) to about 1150 MPA (166 ksi) and a yield strength of at least about 90% of the tensile strength will result in a gasket that is optimized for both durability and sealing function. Preferably, the material will retain about 70% of these respective strengths at gasket operating temperatures. These properties were determined by keeping the internal stress at a minimum value to ensure adequate sealing function.

Testing was performed on materials with a yield strength that is within 90% of the tensile strength, although these materials have a tensile strength below 1000 MPA. The durability of gaskets produced with these materials was adequate, but the sealing capabilities did not meet the desired test requirements. A material with an increase in both tensile strength and yield strength over the tested materials is expected to produce a gasket with desired durability and sealing capacity.

Preferably, materials for second metal layer 32 are stainless steels, including those that are austenitic, martensitic, and ferritic, although other materials, such as an Inconel® that maintains these desired properties at operating temperatures, may also be used.

Figure 3:
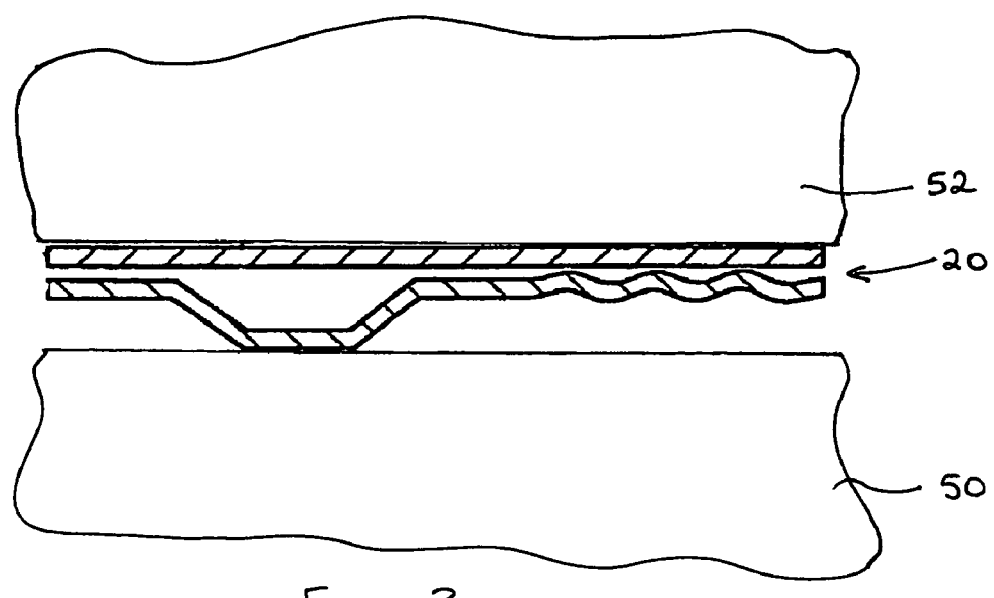
FIG. 3 is a sectional side view of the gasket of FIG. 1 installed between a cylinder head assembly and a cylinder block assembly.

FIG. 3 depicts the gasket described above located between a cylinder head assembly 52 and a cylinder block assembly 50 of an internal combustion engine for a vehicle.

While the invention has been described with respect to specific examples including preferred modes of carrying out the invention, those skilled in the art will appreciate that there are numerous variations and permutations of the above described systems and techniques that fall within the spirit and scope of the invention as set forth in the appended claims.

What is claimed is:

1. A gasket system, comprising:
a cylinder head assembly;
a cylinder block assembly; and
a gasket located between and sealing said cylinder head and said cylinder block, said gasket having a plurality of cylinder apertures, bolt apertures and jacket apertures, said gasket comprising a first metal layer and a second metal layer adjacent said first metal layer, said second metal layer having a bead region and a stopper region, wherein said bead region is formed of a stainless steel, wherein at least a portion of said bead region has a predetermined tensile strength in a range of about 1000 MPA to about 1150 MPA, and a predetermined range of yield strength, wherein said yield strength is greater than about 90% of said tensile strength, wherein approximately 70% of said tensile strength of about 1000 MPA to about 1150 MPA and approximately 70% of said yield strength is throughout the operating conditions of an internal combustion engine for a vehicle.

2. The gasket system of claim 1, wherein said tensile strength of about 1000 MPA to about 1150 MPA is measured at about 70 degrees F., and said bead region has a tensile strength of greater than about 700 MPA at about 1600 degrees F.

3. The gasket system of claim 1, wherein said yield strength of greater than about 90% of said tensile strength is measured at about 70 degrees F., and said bead region has a yield strength greater than about 630 MPA at about 1600 degrees F.

4. The gasket system of claim 1, wherein said bead region surrounds at least one of said cylinder apertures.

5. The gasket system of claim 1, wherein said bead region selectively moves relative to the cylinder block assembly.

6. The gasket system of claim 1, wherein all portions of said metal layer have a predetermined tensile strength in a range of about 1000 MPA to about 1150 MPA, and a predetermined range of yield strength is greater than about 90% of said tensile strength.

7. The gasket system of claim 1, wherein said stopper region circumscribes said bead region.

8. The gasket system of claim 1, wherein said second metal layer is a single sheet of metal forming a cylinder region surface, said bead region and said stopper region.

9. The gasket system of claim 1, wherein said bead region is axially compressible and radially movable.

10. The gasket system of claim 1, wherein said first metal layer is a single sheet of substantially planar metal.

11. A gasket system, comprising:
a cylinder head assembly;
a cylinder block assembly; and
a gasket located between and sealing said cylinder head and said cylinder block, said gasket having a plurality of cylinder apertures, bolt apertures and jacket apertures, said gasket comprising a first metal layer and a second metal layer adjacent said first metal layer, said second metal layer having a bead region and a stopper region, wherein said bead region is formed of a nickel based alloy, wherein at least a portion of said bead region has a predetermined tensile strength in a range of about 1000 MPA to about 1150 MPA, and a predetermined range of yield strength, wherein said yield strength is greater than about 90% of said tensile strength, wherein approximately 70% of said tensile strength of about 1000 MPA to about 1150 MPA and approximately 70% of said yield strength is throughout the operating conditions of an internal combustion engine for a vehicle.

* * * * *